United States Patent
Paty et al.

(10) Patent No.: US 11,721,142 B2
(45) Date of Patent: Aug. 8, 2023

(54) METHOD FOR MANAGING SPORADIC ANOMALIES OF A POWER SYSTEM OF A MOTOR VEHICLE

(71) Applicant: Vitesco Technologies GmbH, Regensburg (DE)

(72) Inventors: Jonathan Paty, Toulouse (FR); Yves Agnus, Toulouse (FR); Lionel Cailler, Toulouse (FR)

(73) Assignee: Vitesco Technologies GmbH

( * ) Notice: Subject to any disclaimer, the term of this patent is extended or adjusted under 35 U.S.C. 154(b) by 0 days.

(21) Appl. No.: 17/762,469

(22) PCT Filed: Nov. 13, 2020

(86) PCT No.: PCT/EP2020/081997
§ 371 (c)(1),
(2) Date: Mar. 22, 2022

(87) PCT Pub. No.: WO2021/099215
PCT Pub. Date: May 27, 2021

(65) Prior Publication Data
US 2022/0343703 A1    Oct. 27, 2022

(30) Foreign Application Priority Data
Nov. 19, 2019   (FR) ...................... 1912901

(51) Int. Cl.
*G07C 5/08*   (2006.01)
*G06F 11/07*  (2006.01)

(52) U.S. Cl.
CPC .......... *G07C 5/0808* (2013.01); *G06F 11/079* (2013.01); *G06F 11/0739* (2013.01)

(58) Field of Classification Search
CPC .. G07C 5/0808; G06F 11/0739; G06F 11/079
See application file for complete search history.

(56) References Cited

U.S. PATENT DOCUMENTS 4,635,214 A      1/1987  Kasai
11,247,702 B2 *  2/2022  Sakamoto ......... B60W 60/0015
(Continued)

FOREIGN PATENT DOCUMENTS

CN        104914849 A     9/2015
DE     102017210859 A1    1/2019
(Continued)

OTHER PUBLICATIONS

English Translation of Written Opinion for International Application No. PCT/EP2020/081997, dated Dec. 18, 2020, 4 pages.
(Continued)

*Primary Examiner* — Hussein Elchanti
(74) *Attorney, Agent, or Firm* — RatnerPrestia

(57) ABSTRACT

A method for managing the sporadic anomalies of a power system of a motor vehicle, the system including a computer and a set of sensors. The computer including a memory area capable of receiving measurements made by the set of sensors and detecting anomalies on the basis of the measurements received, the anomalies of the system being defined in a predetermined list of sporadic anomalies at a given instant. The method including: detecting an anomaly; measuring the duration of the detected anomaly; if the measured duration is less than a predetermined duration threshold, and if the detected anomaly is present in the predetermined list of sporadic anomalies at the current instant, incrementing an occurrence counter; and if the value of the occurrence counter is greater than a predetermined occurrence threshold, confirming the detected anomaly as a sporadic anomaly.

10 Claims, 2 Drawing Sheets

(56) References Cited

U.S. PATENT DOCUMENTS

| | | | |
|---|---|---|---|
| 2015/0254986 A1* | 9/2015 | Fairfield | G08G 1/161 |
| | | | 707/687 |
| 2016/0197484 A1* | 7/2016 | Jost | G01D 21/00 |
| | | | 307/116 |
| 2016/0334230 A1* | 11/2016 | Ross | G01C 21/3415 |
| 2017/0018179 A1* | 1/2017 | Gutierrez | G08G 1/096791 |
| 2017/0141873 A1* | 5/2017 | Mandeville-Clarke | |
| | | | H04W 4/80 |
| 2017/0255199 A1* | 9/2017 | Boehmke | G01S 7/4815 |
| 2017/0262709 A1* | 9/2017 | Wellington | G06F 18/22 |
| 2018/0032076 A1* | 2/2018 | Lombrozo | G01S 15/88 |
| 2018/0040246 A1* | 2/2018 | Yonemura | G08G 1/164 |
| 2018/0053141 A1* | 2/2018 | Shydo, Jr. | G06Q 10/087 |
| 2018/0075538 A1* | 3/2018 | Konrardy | G06Q 40/08 |
| 2018/0082494 A1* | 3/2018 | Rech | G06Q 10/00 |
| 2018/0204398 A1* | 7/2018 | Smith | G07C 5/0808 |
| 2018/0349784 A1* | 12/2018 | Zheng | G06V 10/803 |
| 2019/0001989 A1 | 1/2019 | Schoenfeld et al. | |
| 2019/0163176 A1* | 5/2019 | Wang | G05D 1/0027 |
| 2019/0210637 A1* | 7/2019 | Otake | B62D 5/049 |
| 2020/0124692 A1* | 4/2020 | Ueno | G01R 31/34 |
| 2020/0195146 A1* | 6/2020 | Kihara | H02M 3/155 |

FOREIGN PATENT DOCUMENTS

| | | |
|---|---|---|
| JP | 6310243 A | 1/1988 |
| JP | 0581138 A | 4/1993 |
| WO | 2006102358 A1 | 9/2006 |

OTHER PUBLICATIONS

International Search Report and Written Opinion for International Application No. PCT/EP2020/081997, dated Dec. 18, 2020, with partial English translation, 7 pages.
International Search Report and Written Opinion for International Application No. PCT/EP2020/081997, dated Dec. 18, 2020, 14 pages (French).

* cited by examiner

METHOD FOR MANAGING SPORADIC ANOMALIES OF A POWER SYSTEM OF A MOTOR VEHICLE

CROSS REFERENCE TO RELATED APPLICATIONS

This application is the U.S. National Phase Application of PCT International Application No. PCT/EP2020/081997, filed Nov. 13, 2020, which claims priority to French Patent Application No. FR1912901, filed Nov. 19, 2019, the contents of such applications being incorporated by reference herein.

FIELD OF THE INVENTION

The invention relates to the field of failure detection in a vehicle, and notably to a method for managing what are known as "sporadic" anomalies of a power system of a motor vehicle and to a computer for implementing said method. The invention is intended, notably, to improve the execution of failure diagnostics in motor vehicles.

BACKGROUND OF THE INVENTION

A vehicle comprises, in a known manner, a plurality of sensors, each sensor enabling various parameters of the vehicle to be measured, for example pressure or temperature sensors, and a failure management computer connected to the plurality of sensors.

The computer uses the measured parameters to detect anomalies, notably anomalies that may cause a failure of the vehicle. More precisely, the computer detects an anomaly if the value of a measured parameter is outside a standard operating range for a duration exceeding a predetermined duration threshold.

In order to confirm the detected anomaly, the computer determines whether this anomaly is occurring over a plurality of running cycles of the vehicle, a running cycle corresponding to an engine starting phase, possibly a vehicle running phase, and an engine stopping phase.

However, it has been found that some anomalies, called "sporadic", are not taken into account because, by definition, they do not meet the selection criteria described above. These anomalies have, notably, the characteristic of appearing irregularly or over too short a time interval to be detected. This is a drawback, since an undetected sporadic anomaly cannot be diagnosed, and may thus lead to a failure of the vehicle.

In a known solution, with reference to patent application WO 2006/102358 A1, incorporated herein by reference, a description is given of a vehicle comprising a failure management computer capable of detecting a sporadic anomaly that occurs, for a duration that is longer than a micro-cut threshold, on a number of occasions exceeding a predetermined threshold of occurrence over a running cycle of the vehicle. However, the method described in this document does not allow the detection of sporadic anomalies that occur during the service life of the vehicle and do not meet the aforesaid criteria, and this may lead to a failure of the vehicle.

Consequently there is a need for a solution that enables at least some of the aforementioned drawbacks to be overcome.

SUMMARY OF THE INVENTION

An aspect of the invention relates to a method for managing the sporadic anomalies of a power system of a motor vehicle, said system comprising a computer and a set of sensors, said computer comprising a memory area and being capable of receiving measurements made by the sensors of the set of sensors and detecting anomalies on the basis of the measurements received, the anomalies of the system being defined in a predetermined list of sporadic anomalies at a given instant, said method being characterized in that it comprises the steps of:

a. detecting an anomaly,
b. measuring the duration of the detected anomaly,
c. if the measured duration is less than, notably strictly less than, a predetermined duration threshold, and if the detected anomaly is present in the predetermined list of sporadic anomalies at the current instant, incrementing an occurrence counter,
d. if the value of the occurrence counter is greater than, notably greater than or equal to, a predetermined occurrence threshold, confirming the detected anomaly as a sporadic anomaly.

Preferably, the method comprises a preliminary step of determining the predetermined list of sporadic anomalies, on the basis of a predetermined list of anomalies comprising the set of anomalies and/or errors that have been identified in advance and that may occur in the electronic control unit. At the end of the preliminary step, the predetermined list of sporadic anomalies comprises the anomalies, selected from the predetermined list of anomalies, that could possibly be sporadic.

The method enables the predetermined list of sporadic anomalies to be updated to the current instant, by deleting from said list the anomalies detected as non-sporadic and by confirming the sporadic anomalies. Thus the predetermined list of sporadic anomalies may be used in the context of a diagnostic procedure for detecting sporadic anomalies.

Preferably, if the value of the occurrence counter is greater than, notably greater than or equal to, the predetermined occurrence threshold, the detected anomaly is confirmed if and only if the number of running cycles in which the detected anomaly has appeared at least once is greater than a predetermined running cycles threshold.

Preferably, if the measured duration is greater than the predetermined duration threshold, the detected anomaly is identified as non-sporadic, and is deleted from the predetermined list of sporadic anomalies for the purpose of the next anomaly detection.

Preferably, if the measured duration is greater than the predetermined duration threshold, the detected anomaly is recorded in the predetermined list of anomalies.

Advantageously, after the detected anomaly has been confirmed as a sporadic anomaly, the method comprises a step of operating the power system in a degraded mode.

An aspect of the invention also relates to a computer of a power system of a motor vehicle, said system comprising a set of sensors, said computer comprising a memory area and being capable of receiving measurements made by the sensors of the set of sensors and detecting anomalies on the basis of the measurements received, the anomalies of the system being defined in a predetermined list of sporadic anomalies at a given instant, said computer being configured for:

a. detecting an anomaly,
b. measuring the duration of the detected anomaly,
c. if the measured duration is less than, notably strictly less than, a predetermined duration threshold, and if the detected anomaly is present in the predetermined list of sporadic anomalies, incrementing an occurrence counter, d. if the value of the occurrence counter is greater than, notably greater than or equal to, a predetermined occurrence threshold, confirming the detected anomaly as a sporadic anomaly.

The computer is configured for determining in advance the predetermined list of sporadic anomalies on the basis of the predetermined list of anomalies. For this purpose, the computer is configured for selecting the anomalies that could possibly be sporadic from the predetermined list of anomalies.

The computer enables the predetermined list of sporadic anomalies to be updated to the current instant, by deleting the anomalies detected as non-sporadic from said list and by confirming the sporadic anomalies. Thus the predetermined list of sporadic anomalies may be used in the context of a diagnostic procedure for detecting sporadic anomalies.

Preferably, the computer is configured for confirming the detected anomaly if the value of the occurrence counter is greater than, notably greater than or equal to, the predetermined occurrence threshold, and if and only if the number of running cycles in which the detected anomaly has appeared at least once is greater than a predetermined running cycles threshold.

Advantageously, the computer is configured for identifying a detected anomaly as non-sporadic if the measured duration is greater than the predetermined duration threshold, said computer also being configured for deleting the anomaly that has been detected and identified as non-sporadic from the predetermined list of sporadic anomalies for the purpose of the next anomaly detection.

Also preferably, the computer is configured for recording the detected anomaly in the predetermined list of anomalies if the measured duration is greater than the predetermined duration threshold.

An aspect of the invention also relates to a vehicle, notably a motor vehicle, comprising a power system, said system comprising a set of sensors and a computer such as that described previously.

BRIEF DESCRIPTION OF THE DRAWINGS

Other characteristics and advantages of aspects of the invention will become clear in the light of the following description. This description is purely illustrative and should be read in conjunction with the appended drawings, in which.

DETAILED DESCRIPTION OF THE PREFERRED EMBODIMENTS

Vehicle

Figure 1:
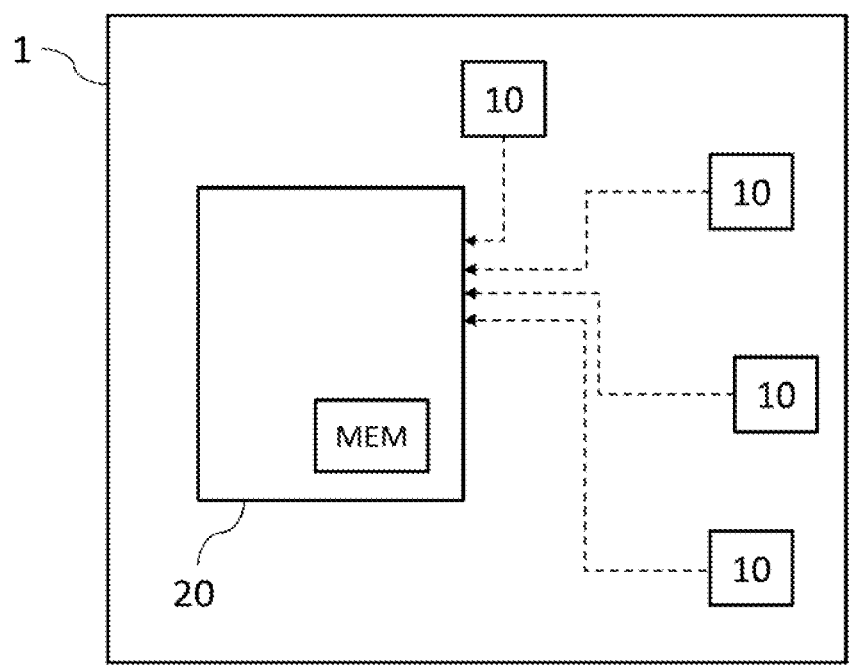
FIG. 1 shows an embodiment of the vehicle according to the invention.

An embodiment of the vehicle 1 will now be described with reference to FIG. 1. Said vehicle 1 comprises a set of sensors 10 and a control computer 20 connected to each sensor 10 of the set of sensors 10.

Sensors 10

The sensors 10 may be of different types, such as, for example, temperature sensors (for air or water), pressure sensors, or alternatively electrical sensors for measuring a voltage or a frequency.

Each sensor 10 is configured for reading, or in other words measuring, the value of a physical magnitude, and for sending the measured value to the computer 20.

Computer 20

The computer 20 comprises a processor able to implement a set of instructions making it possible to perform the functions described hereinbelow.

The computer 20 is configured for receiving each value measured by a sensor 10 of the set of sensors 10.

The computer 20 is also configured for detecting an anomaly in the variation of the value of each physical magnitude measured by a sensor 10 of the set of sensors 10 and subsequently received by the computer 20. In the present case, therefore, an anomaly is taken to mean an irregularity in the variation of the value of the physical magnitude measured by a sensor 10. An irregularity is, for example, a value located outside the range of usual values, notably in the case of a short-circuit of the computer 20, or a variation in value that is too large because it is above a predefined maximum variation.

There are several types of anomalies, namely non-sporadic anomalies and sporadic anomalies.

A non-sporadic anomaly denotes an anomaly that appears regularly. Conversely, a sporadic anomaly denotes an anomaly that appears irregularly, in a discontinuous and/or isolated manner, and not necessarily in each running cycle of a vehicle, a running cycle denoting an interval between the starting of the engine and the first stop of the engine of the vehicle following said starting.

The computer 20 comprises a memory area MEM. The memory area MEM is a storage area, in which, notably, a predetermined list of anomalies is recorded. The predetermined list of anomalies comprises initially, that is to say before any implementation of the method described below, all the anomalies and/or errors identified previously and known, regardless of whether they are sporadic or non-sporadic, that may occur in an electronic control unit.

The memory area MEM also comprises a predetermined list of sporadic anomalies, which forms a subset of the predetermined list of anomalies.

Each sporadic anomaly is characterized by:
a. a predetermined duration threshold S1, representing the maximum duration of the sporadic anomaly,
b. a predetermined occurrence threshold $S_O$, representing the minimum number of occurrences of detection of a sporadic anomaly over the whole service life of the vehicle 1, that is to say over the set of running cycles of the vehicle 1,
c. a predetermined running cycle threshold $S_C$, representing the minimum number of running cycles of the vehicle 1 in which the sporadic anomaly is detected at least once.

Each threshold may be predetermined by the manufacturer and/or by the standards specified for each piece of motor vehicle equipment.

The set of thresholds characterizing each sporadic anomaly may also be recorded in the memory area MEM.

The computer 20 is configured for determining the predetermined list of sporadic anomalies on the basis of the predetermined list of anomalies. For this purpose, the computer 20 selects the anomalies that could possibly be sporadic from the predetermined list of anomalies.

The computer 20 is configured for implementing a first counter, called the "occurrence counter $C_O$", and a second counter, called the "cycle counter $C_C$", for each anomaly detected. The occurrence counter $C_O$ represents the number of times that an anomaly is detected over the service life of the vehicle 1. The cycle counter $C_C$ represents the number of running cycles of the vehicle 1 in which an anomaly is detected at least once. The current value of the occurrence counter $C_O$ and the current value of the cycle counter $C_C$ are recorded in the memory area MEM for each anomaly detected.

The computer 20 is configured for measuring the duration $d_1$ of the detected anomaly.

The computer 20 is configured for identifying a detected anomaly as non-sporadic if the measured duration $d_1$ is greater than or equal to the predetermined duration threshold $S_1$. If the detected anomaly is present in the predetermined list of sporadic anomalies, said computer 20 is also configured for deleting the anomaly that has been detected and identified as non-sporadic from the predetermined list of sporadic anomalies.

If the measured duration $d_1$ is greater than, notably greater than or equal to, the predetermined duration threshold $S_1$, the computer 20 is also configured for recording the detected anomaly in the predetermined list of anomalies.

The computer 20 is also configured for verifying the presence of the detected anomaly in the predetermined list of sporadic anomalies if the measured duration $d_1$ is less than, notably strictly less than, the predetermined duration threshold $S_1$.

The computer 20 is configured for incrementing the occurrence counter $C_O$ if the measured duration $d_1$ is less than, notably strictly less than, the predetermined duration threshold $S_1$, and if the detected anomaly is present in the predetermined list of sporadic anomalies.

The computer 20 is configured for incrementing the cycle counter $C_C$ if the measured duration $d_1$ is less than, notably strictly less than, the predetermined duration threshold $S_1$, if the detected anomaly is present in the predetermined list of sporadic anomalies and if the detected anomaly has been detected for the first time in the current running cycle.

The computer 20 is also configured for confirming the detected anomaly as a sporadic anomaly if the value of the occurrence counter $C_O$ is greater than the predetermined occurrence threshold $S_O$.

The computer 20 is configured for confirming that a detected anomaly is actually sporadic, if, and only if, the number of running cycles in which the detected anomaly has appeared at least once is greater than a predetermined running cycle threshold $S_C$, or in other words if the current value of the cycle counter $C_C$ is greater than, notably greater than or equal to, the cycle threshold $S_C$.

The computer 20 is thus capable of conducting the failure diagnostic procedure for a motor vehicle on the basis of the predetermined list of sporadic anomalies.

Method

Figure 2:
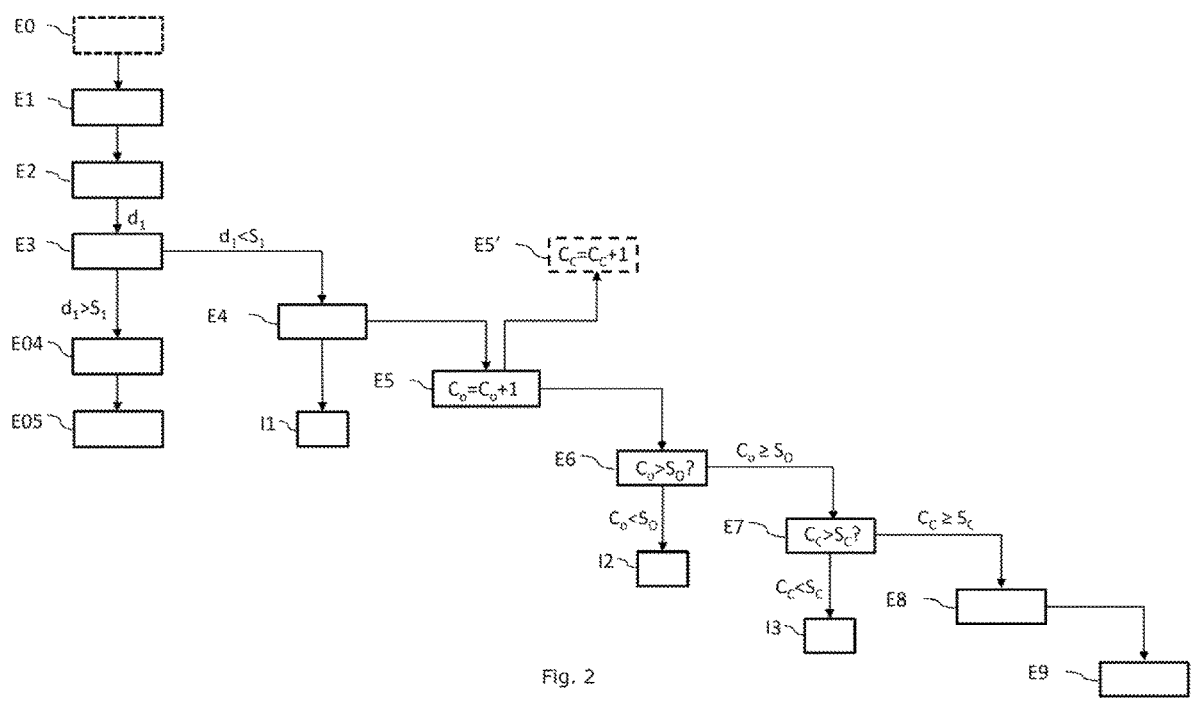
FIG. 2 shows an embodiment of the method according to the invention.

With reference to FIG. 2, a representation will now be given of an embodiment of the method for managing the sporadic anomalies of a power system of a motor vehicle, implemented by a computer 20 such as that described above.

The following method is described for the detection of a single anomaly. The predetermined duration threshold $S_1$, the predetermined occurrence threshold $S_O$ and the cycle threshold $S_C$ associated with said detected anomaly will therefore be taken into consideration. Evidently, the method may be executed in order to detect a plurality of different sporadic anomalies.

The method comprises, initially, a preliminary step E0 of determining the predetermined list of sporadic anomalies on the basis of the predetermined list of anomalies. For this purpose, the computer 20 selects the anomalies that could possibly be sporadic from the predetermined list of anomalies.

The computer 20 receives each value measured by a sensor 10 of the set of sensors 10.

The Detection Step E1

Initially, the method comprises a step E1 of detection of an anomaly by the computer 20, notably by analysis of the received measured values for the purpose of detecting any irregularity in the variation of the value of the physical magnitude measured by a sensor 10.

The Measurement Step E2

If an anomaly is detected, the method then comprises a step E2 of measuring the duration, denoted $d_1$, of the detected anomaly.

The Comparison Step E3

The method then comprises a step E3 of comparing the measured duration $d_1$ with the predetermined duration threshold $S_1$.

If the measured duration $d_1$ is greater than, notably greater than or equal to, the predetermined duration threshold $S_1$, then the detected anomaly is a non-sporadic anomaly. In this case, if the detected anomaly is present in the predetermined list of sporadic anomalies at the current instant, the method comprises a step E04 of deleting the detected anomaly from the predetermined list of sporadic anomalies. Finally, the method comprises a step E05 of recording the detected anomaly in the predetermined list of anomalies.

The deletion step E04 may also be executed after the recording step E05.

Additionally, if the measured duration $d_1$ is less than, notably strictly less than, the predetermined duration threshold $S_1$, the method comprises a step E4 of verifying the presence of the detected anomaly in the predetermined list of sporadic anomalies.

If the detected anomaly is not present in the predetermined list of sporadic anomalies, the detected anomaly is ignored (step denoted I1), because it does not correspond to a sporadic anomaly, and the method restarts when a new anomaly is detected.

Conversely, if the detected anomaly is present in the predetermined list of sporadic anomalies, the method comprises a step E5 of incrementing the occurrence counter $C_O$ with this detected anomaly.

Additionally, if the detected anomaly is present in the predetermined list of sporadic anomalies, the method comprises a step E5' of incrementing the running cycle counter $C_C$, representing the number of running cycles of the vehicle 1 in which an anomaly is detected at least once in the current running cycle. The cycle counter $C_C$ is incremented if, and only if, the detected anomaly has been detected for the first time in the current running cycle. The step E5' of incrementing the running cycle counter $C_C$ may, notably, be executed simultaneously with step E5 of incrementing the occurrence counter $C_O$ for the detected anomaly.

The Comparison Step E6

Following the incrementation of the occurrence counter $C_O$ and the running cycle counter $C_C$, the method comprises a step E6 of comparing the value of the occurrence counter $C_O$ with the predetermined occurrence threshold $S_O$.

If the value of the occurrence counter $C_O$ is strictly less than the occurrence threshold $S_O$, the detected anomaly is ignored (step denoted I2), and the method will restart when a new sporadic anomaly is detected.

If the value of the occurrence counter $C_O$ is greater than, notably greater than or equal to, the occurrence threshold $S_O$, the method comprises a step E7 of comparing the value of the cycle counter $C_C$ with the value of the predetermined running cycle threshold $S_C$.

The Comparison Step E7

If the value of the cycle counter $C_C$ is less than, notably strictly less than, the cycle threshold $S_C$, the detected anomaly is ignored (step denoted 13), and the method will restart when a new sporadic anomaly is detected.

Conversely, if the value of the cycle counter $C_C$ is greater than, notably greater than or equal to, the cycle threshold $S_C$, the detected anomaly is confirmed in a confirmation step E8.

In other words, in the confirmation step E8, the detected anomaly is identified as sporadic. Thus the method may be used to detect and confirm that a detected anomaly is sporadic.

The Operating Step E9

Finally, after the detected anomaly has been confirmed in E8 as a sporadic anomaly, the method comprises a step E9 of operating the power system in a degraded mode, making it possible, notably, to prevent a failure from occurring in the vehicle 1 because of undetected sporadic anomalies. If the system operates in a degraded mode, for example, the fuel injection or the engine speed is limited.

Each iteration of the method makes it possible, notably, to update the predetermined list of sporadic anomalies to the current instant, by deleting from said list the anomalies detected as non-sporadic and by confirming the sporadic anomalies. Thus the predetermined list of sporadic anomalies may be used in the subsequent iteration of the method, for the next anomaly detection.

The updated predetermined list of sporadic anomalies may also be used in the execution of a diagnostic procedure, for the purpose of identifying a failure of the vehicle 1.

The invention claimed is:

1. A method for managing the sporadic anomalies of a power system of a motor vehicle, said system comprising a computer and a set of sensors, said computer comprising a memory area and being configured to receive measurements made by the sensors of the set of sensors and to detect anomalies on the basis of the measurements received, the anomalies of the system being defined in a predetermined list of sporadic anomalies at a given instant, said method comprising:
   a) detecting an anomaly,
   b) measuring a duration of the detected anomaly,
   c) verifying a presence of the detected anomaly in the predetermined list of sporadic anomalies,
   d) incrementing an occurrence counter when the measured duration is less than a predetermined duration threshold, and when the detected anomaly is present in the predetermined list of sporadic anomalies at the current instant,
   e) confirming the detected anomaly as a sporadic anomaly when the value of the occurrence counter is greater than a predetermined occurrence threshold, and
   f) operating the power system of the motor vehicle based on the predetermined list of sporadic anomalies updated with the confirmed sporadic anomaly.

2. The method as claimed in claim 1, wherein the detected anomaly is confirmed when the value of the occurrence counter is greater than the predetermined occurrence threshold and when a number of running cycles of the motor vehicle in which the detected anomaly has appeared at least once is greater than a predetermined running cycle threshold.

3. The method as claimed in claim 1, wherein, if the measured duration is greater than the predetermined duration threshold, the detected anomaly is identified as non-sporadic, and is deleted from the predetermined list of sporadic anomalies for the purpose of the next anomaly detection.

4. The method as claimed in claim 1, wherein, if the measured duration is greater than the predetermined duration threshold, the detected anomaly is recorded in a predetermined list of anomalies.

5. The method as claimed in claim 1, further comprising, after the detected anomaly has been confirmed as a sporadic anomaly, operating the power system in a degraded mode.

6. A computer of a power system of a motor vehicle, said system comprising a set of sensors, said computer comprising a memory area and being configured to receive measurements made by the sensors of the set of sensors and to detect anomalies on the basis of the measurements received, the anomalies of the system being defined in a predetermined list of sporadic anomalies at a given instant, said computer being configured for:
   a) detecting an anomaly,
   b) measuring a duration of the detected anomaly,
   c) if the measured duration is less than a predetermined duration threshold, and if the detected anomaly is present in the predetermined list of sporadic anomalies, incrementing an occurrence counter,
   d) if the value of the occurrence counter is greater than a predetermined occurrence threshold $S_O$, confirming the detected anomaly as a sporadic anomaly, and
   e) operating the power system of the motor vehicle based on the predetermined list of sporadic anomalies updated with the confirmed sporadic anomaly.

7. The computer as claimed in claim 6, further configured for confirming the detected anomaly when the value of the occurrence counter is greater than the predetermined occurrence threshold, and when the number of running cycles of the motor vehicle in which the detected anomaly has appeared at least once is greater than a predetermined running cycle threshold.

8. The computer as claimed in claim 6, configured for identifying a detected anomaly as non-sporadic if the measured duration is greater than the predetermined duration threshold, said computer also being configured for deleting the anomaly that has been detected and identified as non-sporadic from the predetermined list of sporadic anomalies for the purpose of the next anomaly detection.

9. The computer as claimed in claim 6, configured for recording the detected anomaly in a predetermined list of anomalies if the measured duration is greater than the predetermined duration threshold.

10. A motor vehicle, comprising:
   a power system comprising a set of sensors, and
   a computer comprising a memory area and being configured to receive measurements made by the sensors of the set of sensors and to detect anomalies on the basis of the measurements received, the anomalies of the system being defined in a predetermined list of sporadic anomalies at a given instant, said computer being configured for:
   a) detecting an anomaly,
   b) measuring a duration of the detected anomaly,
   c) incrementing an occurrence counter when the measured duration is less than a predetermined duration threshold, and when the detected anomaly is present in the predetermined list of sporadic anomalies,
   d) confirming the detected anomaly as a sporadic anomaly when the value of the occurrence counter is greater than a predetermined occurrence threshold, and
   e) operating the power system of the motor vehicle based on the predetermined list of sporadic anomalies updated with the confirmed sporadic anomaly.

* * * * *